United States Patent
Zvanut et al.

(10) Patent No.: US 9,166,522 B1
(45) Date of Patent: Oct. 20, 2015

(54) SOLAR PANEL MOUNTING ASSEMBLY

(71) Applicants: Jason Zvanut, San Rafael, CA (US); Gabe Cohn, Mill Valley, CA (US)

(72) Inventors: Jason Zvanut, San Rafael, CA (US); Gabe Cohn, Mill Valley, CA (US)

( * ) Notice: Subject to any disclaimer, the term of this patent is extended or adjusted under 35 U.S.C. 154(b) by 0 days.

(21) Appl. No.: 14/576,938

(22) Filed: Dec. 19, 2014

Related U.S. Application Data

(60) Provisional application No. 61/918,375, filed on Dec. 19, 2013.

(51) Int. Cl.
*H02S 20/23* (2014.01)
*F24J 2/52* (2006.01)

(52) U.S. Cl.
CPC .............. *H02S 20/23* (2014.12); *F24J 2/5258* (2013.01); *Y02B 10/12* (2013.01); *Y02E 10/47* (2013.01)

(58) Field of Classification Search
CPC ........ H02S 20/23; H02S 20/24; F24J 2/5258; F24J 2/5207; Y02E 10/47; Y02B 10/10; Y02B 10/12
USPC .................................. 52/173.3, 263
See application file for complete search history.

(56) References Cited

U.S. PATENT DOCUMENTS

| | | | | |
|---|---|---|---|---|
| 3,861,098 A | * | 1/1975 | Schaub | 52/98 |
| 6,105,317 A | * | 8/2000 | Tomiuchi et al. | 52/173.3 |
| 6,672,018 B2 | * | 1/2004 | Shingleton | 52/173.3 |
| 7,435,134 B2 | * | 10/2008 | Lenox | 439/567 |
| 7,780,472 B2 | * | 8/2010 | Lenox | 439/567 |
| 8,156,697 B2 | * | 4/2012 | Miros et al. | 52/173.3 |
| 8,424,255 B2 | | 4/2013 | Lenox et al. | |
| 8,505,864 B1 | * | 8/2013 | Taylor et al. | 248/237 |
| 8,683,761 B2 | * | 4/2014 | Danning | 52/173.3 |
| 8,740,163 B1 | * | 6/2014 | Taylor et al. | 248/237 |
| 8,813,441 B2 | * | 8/2014 | Rizzo | 52/173.3 |
| 8,844,215 B2 | * | 9/2014 | Wildes et al. | 52/173.3 |
| 8,925,263 B2 | * | 1/2015 | Haddock et al. | 52/173.3 |
| 2003/0094193 A1 | * | 5/2003 | Mapes et al. | 136/244 |
| 2006/0248814 A1 | * | 11/2006 | Chen et al. | 52/126.6 |
| 2009/0200443 A1 | * | 8/2009 | Burtscher et al. | 248/316.1 |
| 2011/0036028 A1 | * | 2/2011 | Beck | 52/173.3 |
| 2011/0138585 A1 | * | 6/2011 | Kmita et al. | 24/522 |
| 2011/0214365 A1 | * | 9/2011 | Aftanas | 52/173.3 |
| 2011/0260027 A1 | * | 10/2011 | Farnham, Jr. | 248/309.1 |
| 2013/0291479 A1 | * | 11/2013 | Schaefer et al. | 52/745.21 |
| 2013/0340358 A1 | * | 12/2013 | Danning | 52/126.7 |

FOREIGN PATENT DOCUMENTS

| | | | | |
|---|---|---|---|---|
| DE | 202010005505 U1 | * | 9/2010 | |
| FR | 2567945 A1 | * | 1/1986 | E04C 2/38 |
| JP | 2011032723 A | * | 2/2011 | |

* cited by examiner

*Primary Examiner* — James Ference
*Assistant Examiner* — Charissa Ahmad
(74) *Attorney, Agent, or Firm* — Jay P. Hendrickson

(57) ABSTRACT

A solar panel mounting assembly for securing a solar panel to a structure with the assembly comprising a mounting block having mounting block partitions forming a cross-shaped pattern that abut the solar panel, a threaded male member extending out of the mounting block, and a mounting plate and fastener cap for securing the solar panel to the mounting block.

2 Claims, 6 Drawing Sheets

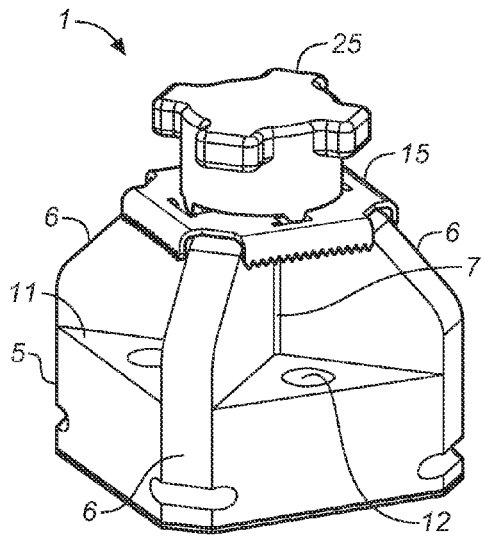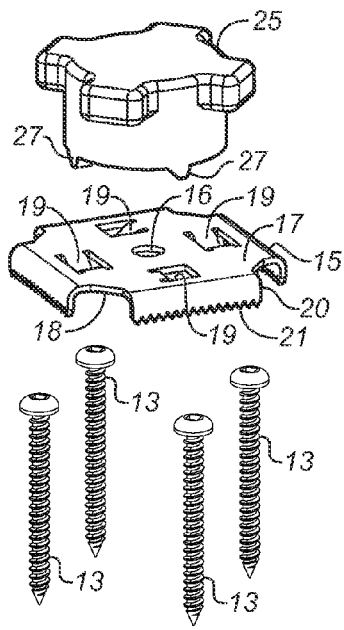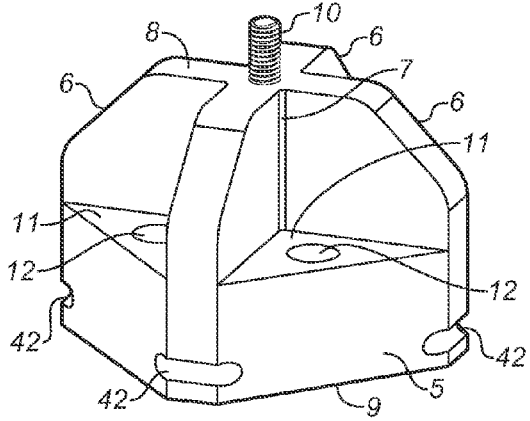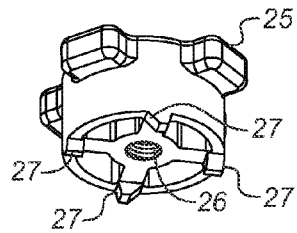
FIG. 1A
FIG. 1B
FIG. 1C

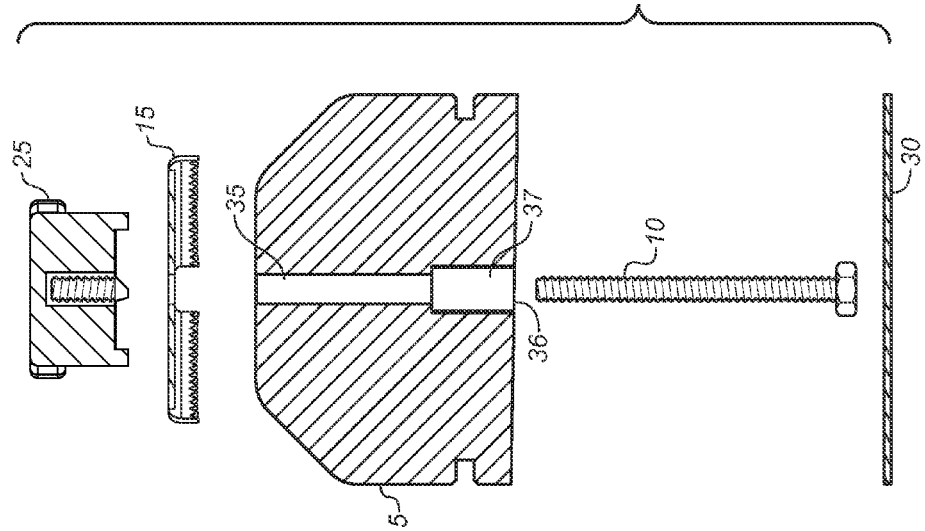
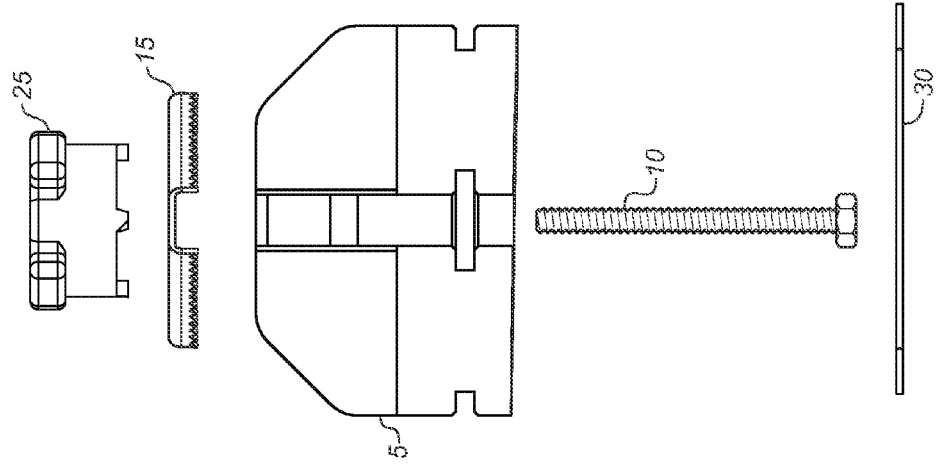

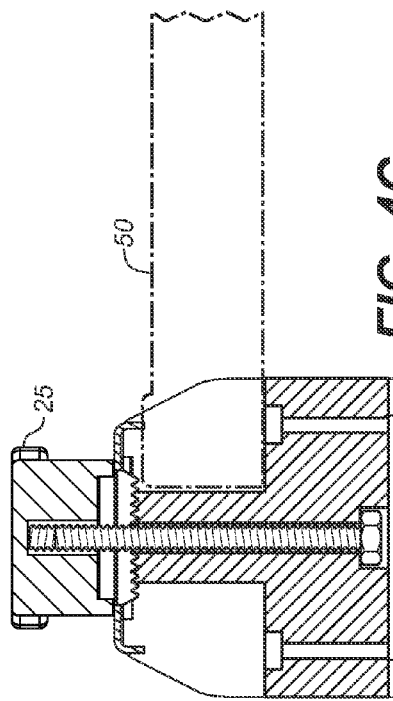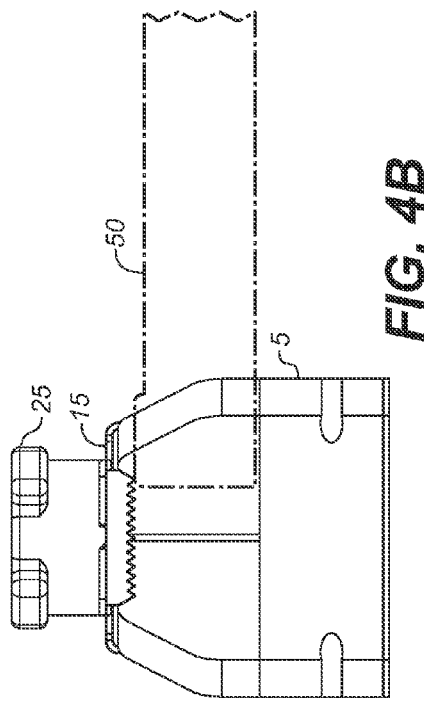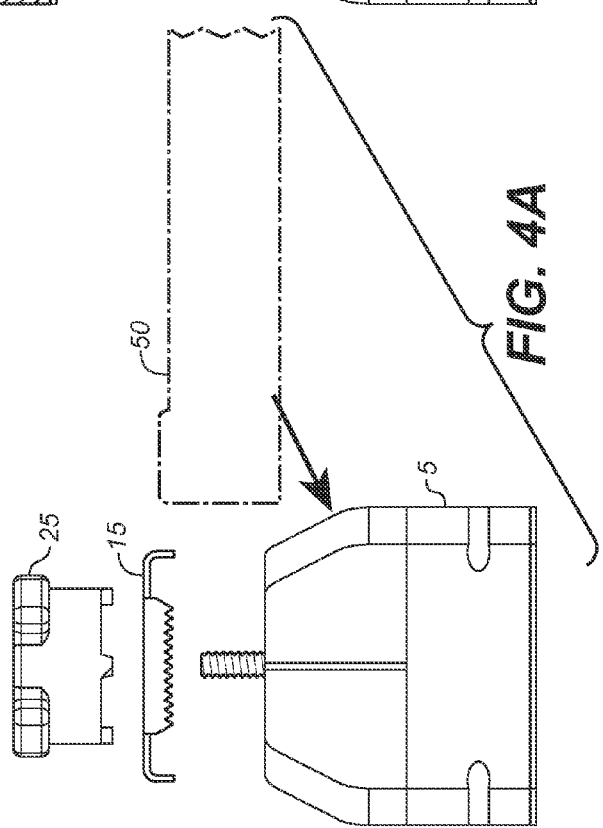

SOLAR PANEL MOUNTING ASSEMBLY

PRIORITY

This application relates to and claims the benefit under 35 U.S.C. §119(e) of U.S. provisional patent application No. 61/918,375 file on Dec. 19, 2013.

TECHNICAL FIELD

This application relates to mounting assemblies and methods for securing photovoltaic solar panels to a structure such as a roof on a building.

BACKGROUND

Solar energy collection panels are typically mounted on rooftops with an elevated framing system consisting of vertical stanchions, normally secured to roof joists and lateral rails. Since the vertical stanchions must extend through the roof decking to reach the joists, sheet metal flashing must be installed around the openings in order to prevent leakage. The lateral rails are then bolted to the top of the stanchions, upon which the solar panels are fastened using clamps and bolts, while the structure is held in place by field installation personnel. This type of system allows many different solar panel types and sizes to comply with typical structural member spacing of 24" to 32" on center, but requires a substantial collection of specialized hardware components and intensive field labor to measure, cut, drill, and attach the hardware to the rooftop.

A recent attempt to overcome some of the limitations of elevated framing systems is disclosed in U.S. Pat. No. 8,424,255 ('255 Patent). The '255 Patent discloses the utilization of mounting assemblies that appear to replace use of vertical stanchions and attached lateral rails as in the prior art. However the patent's mounting assembly does not disclose or suggest any structure that is integral with the assembly that could be used to simultaneously align a solar panel both longitudinally and latitudinally on the roof of a structure. In fact, the patent actually teaches away from providing a mounting assembly that provides for a bi-directional alignment of a solar panel since the patent discloses and illustrates that a separate layout tool should be used to ensure that the solar panels are aligned properly along "two axes" (Col 6, lines 36-50).

SUMMARY OF THE INVENTION

A solar panel mounting assembly for securing a solar panel to a structure comprises:
1) a mounting block comprising:
   four mounting block partitions that are integral with a top end of the mounting block, with each mounting block partition perpendicular to adjacent mounting block partitions and with an end of each mounting block partition integral with a mounting block center section that extends from a mounting block top surface to a mounting block bottom surface;
   a threaded male member disposed within an elongate opening through the mounting block center section, with a portion of said threaded male member extending away from the mounting block top surface; and
   four mounting surfaces, with each mounting surface extending between and perpendicular to adjacent mountain block partitions, and with each of the mounting surfaces having a fastener opening that extends from the mounting surface to the bottom surface of the mounting block, with the fastener openings for use with fasteners in securing the mounting block to the structure;
2) a mounting plate having a plate opening that extends from a plate top surface to a plate bottom surface, with the plate opening for positioning the mounting plate around the threaded male member, with the mounting plate also having grounding serrations integral with the plate bottom surface; and
3) a fastener cap having a threaded female member for accepting said threaded male member, with the fastener cap also having a plurality of locking projections for securing the fastener cap to the mounting plate; whereby the solar panel mounting assembly can be used to secure the solar panel to the structure by fastening the four mounting blocks to the structure, placing the solar panel between the mounting blocks with each corner of the solar panel resting on a mounting surface of a corresponding mounting block and abutting adjacent mounting block partitions, positioning four mounting plates around corresponding threaded male members, and threading four fastener caps onto the corresponding threaded male members in order to contact the mounting plate's grounding serrations with a conductive surface disposed around the perimeter of the solar panel, thereby securing the solar panel to the structure.

BRIEF DESCRIPTION OF THE DRAWINGS

FIG. 1A is a perspective view of the solar panel mounting assembly

FIG. 1B is an exploded view of the solar panel mounting assembly.

FIG. 1C is a perspective view of the fastener cap, showing the bottom end of the fastener cap.

FIG. 2A is a side view of the solar panel mounting assembly.

FIG. 2B B is a cross-sectional side view of the solar panel mounting assembly.

FIG. 4A is a partial exploded side view of the solar panel mounting assembly, illustrating the positioning of a solar panel adjacent to the assembly.

FIG. 4B is a side view of the solar panel mounting assembly, illustrating a solar panel that is resting on a mounting surface within the solar panel mounting assembly.

FIG. 4C is a cross-sectional side view of the solar panel mounting assembly, illustrating a solar panel that is resting on a mounting surface within the solar panel mounting assembly.

DETAILED DESCRIPTION OF THE INVENTION

Figure 3:
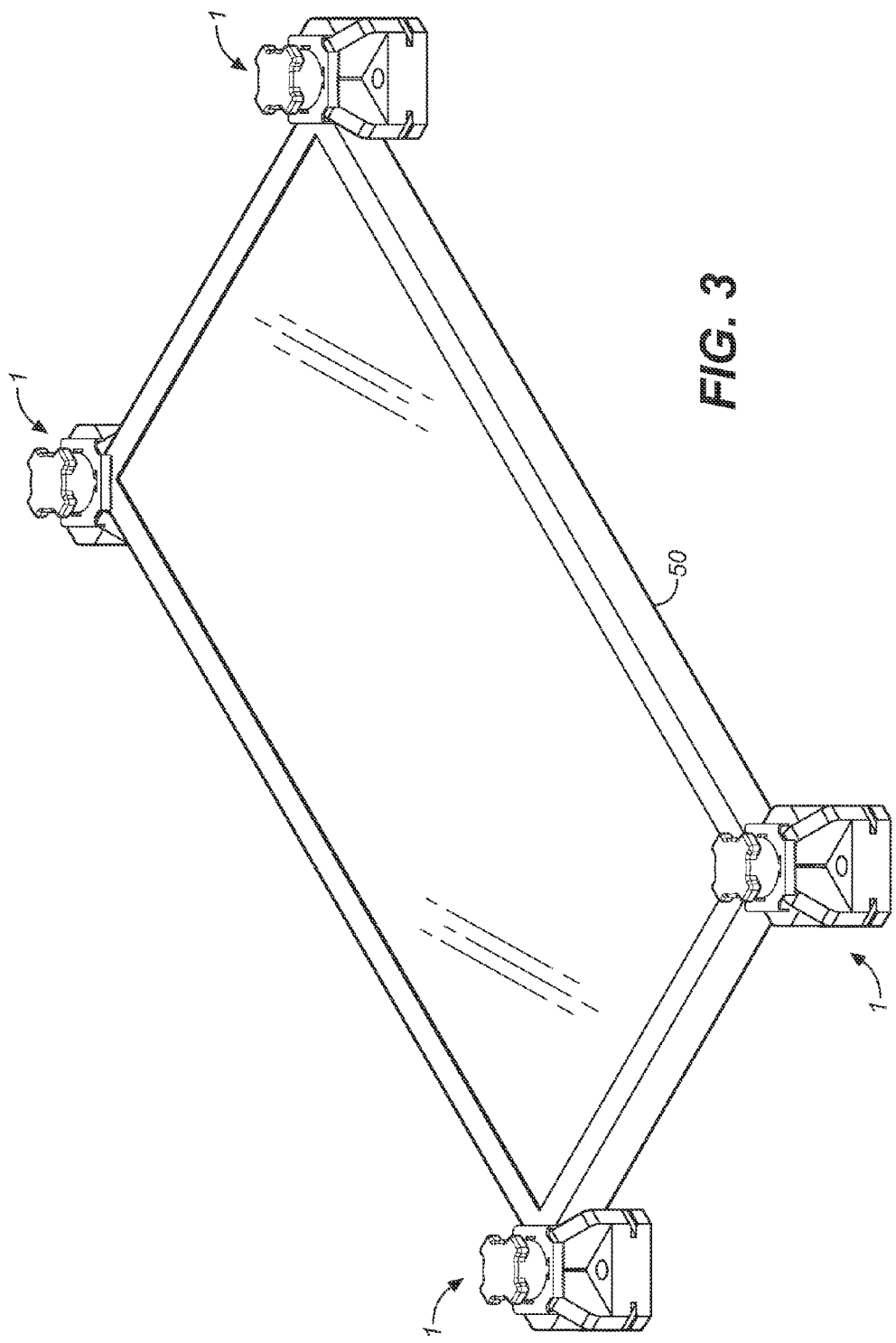
FIG. 3 is a perspective view of solar mounting assemblies attached to a solar panel.

FIG. 1A and FIG. 1B illustrate a perspective view and an exploded view, respectively, of the solar panel mounting assembly 1 that can be used to mount an array of solar panels 50 to a structure, typically the roof of a building. The term "solar panel" refers to a class of photoelectric rectangularly-shaped panels having four perpendicular sides and a conductive material disposed around the perimeter of the rectangularly-shaped panel. As shown, the solar panel mounting assembly 1 comprises a mounting block 5 having four mounting block partitions 6 that are integral with a top end of the mounting block 5, with the four mounting block partitions 6 forming a "cross-shaped" pattern with each mounting block partition 6 being perpendicular to adjacent mounting block partitions 6, and with an end of each mounting block partition 6 being integral with a mounting block center section 7 that extends from a mounting block top surface 8 to a mounting block bottom surface 9. As shown in more detail in FIG. 2A and FIG. 2B, a threaded male member 10 is disposed within an elongate opening 35 through the mounting block center section 7, with a portion of the threaded male member 10 extending away from the mounting block center section 7. Four mounting surfaces 11 extend between and are perpendicular to corresponding mounting block partitions 6, with each of the mounting surfaces 11 having a fastener opening 12 that extends from the mounting surface 11 to the mounting block bottom surface 9.

As also shown in the figures, the solar panel mounting assembly 1 further comprises a rectangular mounting plate 15 made of an electrically conductive material, with the mounting plate 15 having a plate opening 16 that extends from a plate top surface 17 to a plate bottom surface 18, with the plate opening 16 for positioning the mounting plate 15 around the threaded male member 10. The mounting plate 15 also comprises: 1) four locking flanges 19 with associated openings, with the locking flanges extending downward from the plate top surface 17; and 2) four edge segments 20 that extend generally downward from the plate top surface 17, with an end portion of each edge segment 20 having grounding serrations 21. Also illustrated is a fastener cap 25 which, as shown in FIG. 1C, comprises an internal threaded female member 26 that can be used to screw the fastener cap 25 onto the mounting block's threaded male member 10. The fastener cap 25 further comprises four locking projections 27 disposed around the bottom perimeter of the fastener cap 25, with the locking projections 27 positioned so as to engage the mounting plate's four locking flanges 19 when the fastener cap 25 is hand tightened down to securely engage the mounting plate 15.

Referring now to FIG. 2A and FIG. 2B, the figures further illustrate in exploded views that the threaded male member 10 can be disposed within the elongate opening 35 by inserting the threaded end of the threaded male member 10 into a bottom end 36 of elongate opening 35, with the head of the threaded male member 10 engaging a cavity 37 to prevent the threaded male member 10 from turning when the fastener cap 25 is screwed onto the threaded male member 10.

As illustrated in FIG. 3, the mounting block assembly 1 can be used to mount at least one rectangular-shaped solar panel 50 to a building structure such as a roof, with each solar panel corner supported by and attached to a mounting block assembly 1 that is attached to the roof. Installation of a solar panel 50 on a roof is preferably performed by initially positioning the solar panel 50 on the roof in the desired location and placing a mounting block 5 under each of the solar panel's corners by resting each corner on the mounting surface 11 of a corresponding mounting block 5 and abutting each corner to adjacent mounting block partitions 6. And, a mounting gasket 30, as shown in FIG. 1A and FIG. 1B, can be positioned between the roof surface and the mounting block bottom surface 9 in order to provide a sealed connection between the two surfaces. Fasteners 13, for example the screws as shown in FIG. 1B, can be utilized to attach the mounting blocks 5 to the roof surface by inserting the fasteners 13 into the fastener openings 12 and screwing the fasteners 13 into the roof structure. However, since the solar panel 50 will be covering up one of the fastener openings 12 on each mounting block, it will only be possible to the screw fasteners 13 through the three fastener openings that are uncovered. Rather than being a limitation, however, this feature is a significant advantage of the solar panel mounting assembly 1. Since each mounting block 5 has a "cross-shaped" pattern with the mounting block partitions 6 perpendicular to adjacent mounting block partitions 6, the four mounting blocks can be utilized to accurately and simultaneously align the solar panel 50 in both a longitudinal and a latitudinal direction on the roof, without the use of any other alignment procedures. Once the four mounting blocks 5 are secured to the roof, the solar panel 50 can be briefly lifted off of the mounting blocks 5; a fastener 13 can be screwed through each of the four fastener openings 12 that were previously covered by the solar panel; and the solar panel re-placed on the mounting blocks 5, resting on the mounting surfaces 11.

The solar panel corners can then be secured to the four mounting blocks 5 by placing the mounting plate 15 around the threaded male member 10 of each mounting block 5 and screwing the fastener cap 25 onto each threaded male member 10 until the locking projections 27 on the faster cap 25 engage the locking flanges 19 on the mounting plate 15. The mounting blocks 5 can be sized such that when the solar panel 50 is positioned on the mounting blocks 5, the top metal edge of the solar panel is approximately flush with the mounting block top surface 9. When each fastener cap 25 is locked into place, the grounding serrations 20 on a corresponding mounting plate 15 will contact and slightly depress the electrically conductive material that is disposed around the perimeter of solar panel 50, thereby ensuring an electrically grounded connection between each mounting plate 15 and the solar panel 50. FIG. 4A and FIG. 4B illustrate in more detail the positioning of the solar panel 50 (shown in dotted lines) on the mounting surface 11 of each mounting block 5 and the engagement of the mounting serrations 21 of each mounting plate 15 with the electrically conductive material around the perimeter the solar panel 50.

Figure 5:
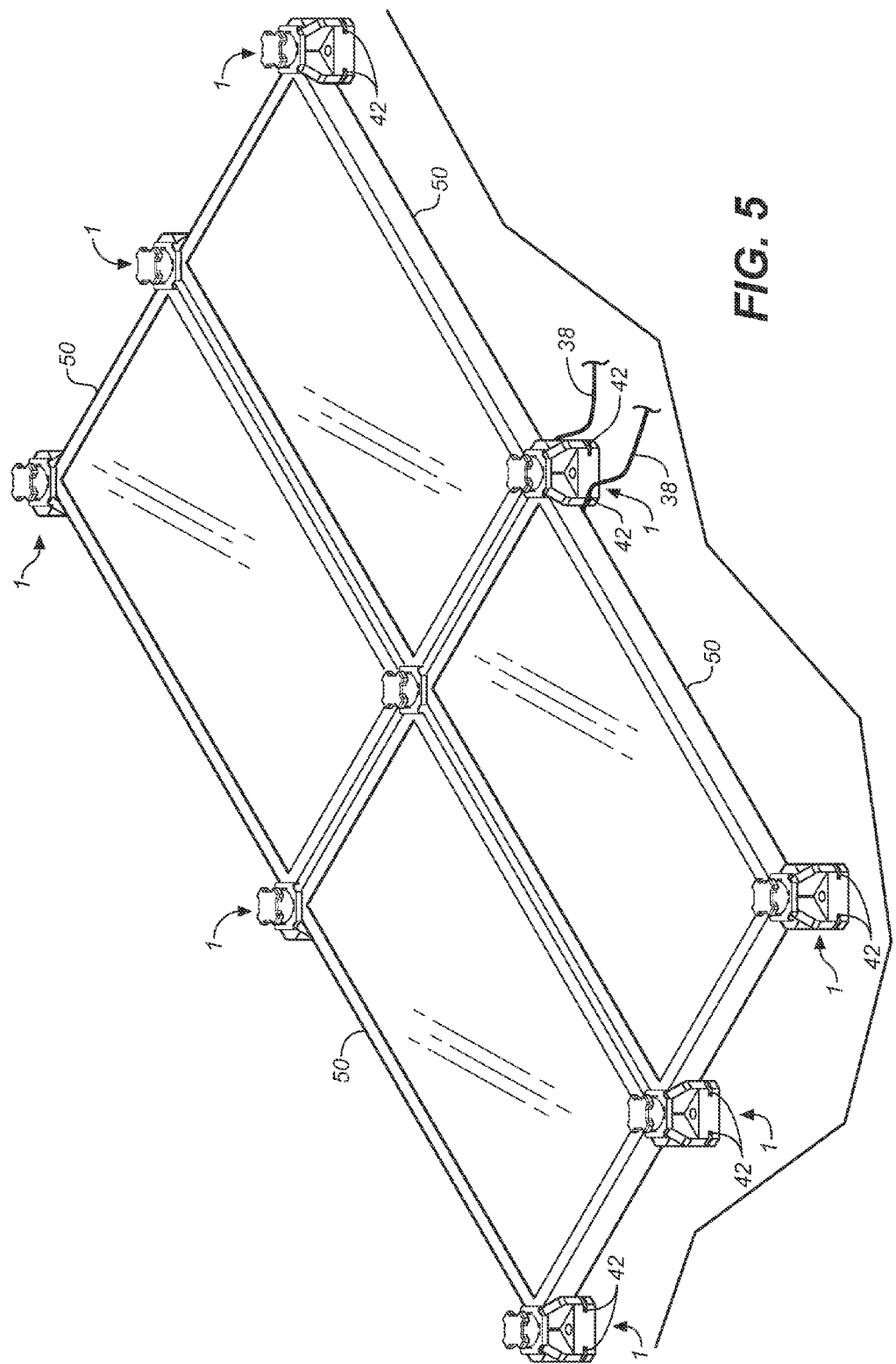
FIG. 5 is a perspective view of an array of solar panels that are connected together using nine solar panel assemblies that can be attached to a building structure, such as a roof.

In addition to mounting a single solar panel on a roof, the solar panel mounting assemblies 1, as illustrated in FIG. 5, can be used to mount an array of adjacent solar panels 50, forming longitudinal rows and latitudinal columns of solar panels. Preferably, the first step in installing an array of solar panels 50 is to attach four mounting blocks 5 to the roof as described above in connection with the mounting of a single solar panel. These mounting blocks, referred to herein as "a set of aligning blocks", can then be used to align, both longitudinally and latitudinally, all of the other adjacent solar panels 50 and their corresponding mounting blocks 5 in the array. More specifically, at least one solar panel out of the array of solar panels 50 is positioned adjacent to two of the adjacent aligning blocks 5 out of the set of aligning blocks, and adjacent corners of the solar panel are placed on mounting surfaces 11 of the adjacent aligning blocks 5, with the adjacent corners of the solar panel abutting aligning block partitions 6 integral with the adjacent aligning blocks 5. Then, the other two adjacent corners of the solar panel are placed on mounting surfaces 11 of corresponding mounting blocks 5, with the adjacent corners of the solar panel abutting the mounting block partitions 6 integral with the mounting blocks 5. Once the solar panel is thereby positioned, the mounting blocks 5 are secured to the structure using fasteners 13. In this manner, the utilization of the aligning blocks 5 on one end of the solar panel and mounting blocks 5 on the other end, aligns the at least one solar panel out of the array of solar panels 50 in the same longitudinal and latitudinal orientation as the single solar panel that was used to establish the positions of the aligning blocks 5. And, additional solar panels out of the array of solar panels 50 can be positioned on other aligning blocks and mounting blocks in the same manner to add to the array of solar panels 50. As in the installation of the single solar panel, the array of solar panels 50 are secured to the aligning blocks and mounting blocks by using the mounting plate 15 and fastener cap 25. When the mounting plate 15 is installed its grounding serrations 21 contact the conductive corners of each of the solar panels in the array of solar panels 50, which in turn creates a continuous electrical grounding path between all of the solar panels in the array. Each solar panel mounting assembly 1 can also comprise a plurality of notches 42 integral with an outside surface of the mounting block 5, with the notches 42 for use in holding electrical wires 38 conducting electrical current from the solar panel off of the structure.

Figure 6:
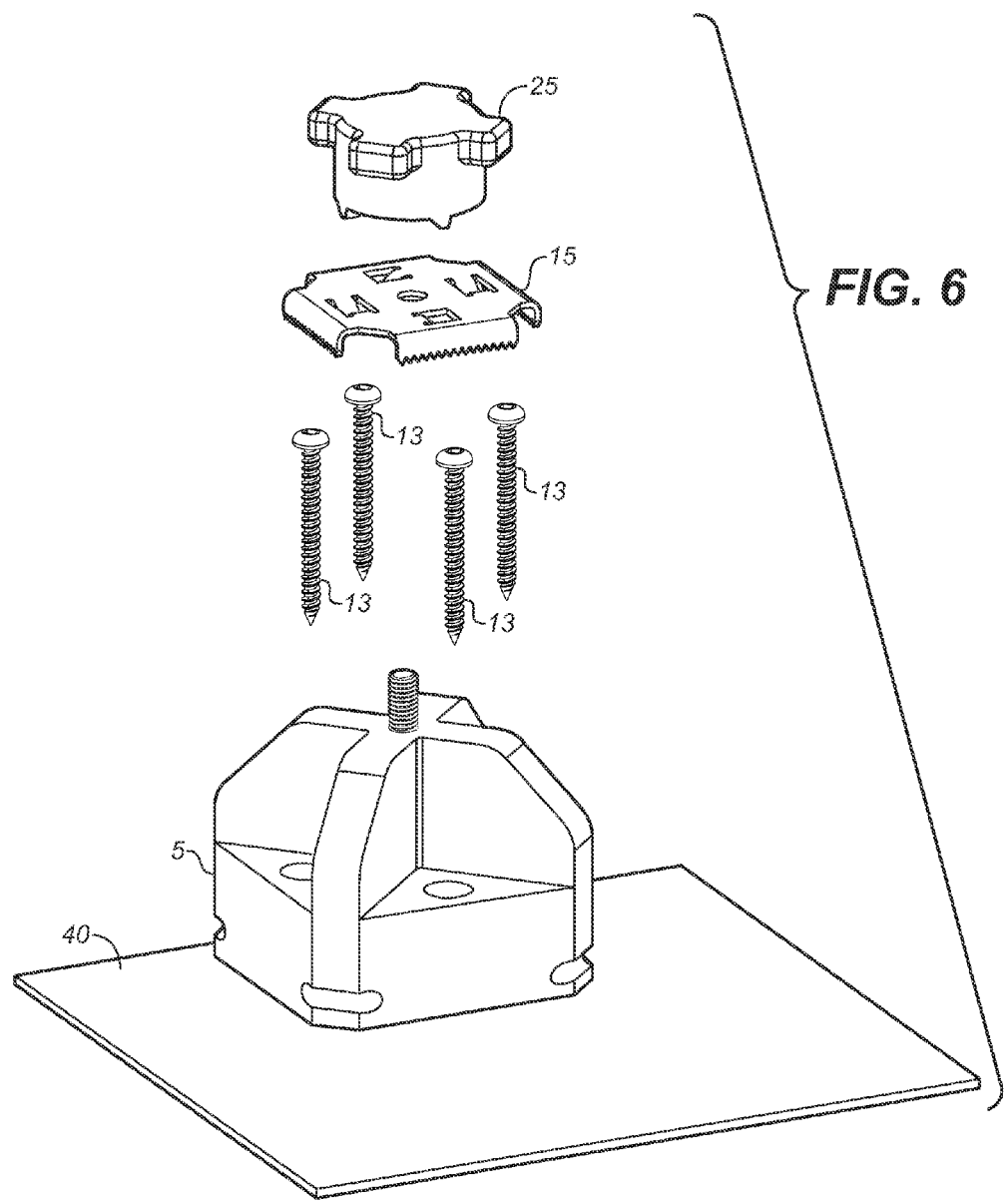
FIG. 6 is an exploded view of the solar panel mounting assembly having an integral flashing panel.

Another embodiment of the solar panel mounting assembly is illustrated in FIG. 6. In this embodiment, the solar panel mounting assembly 1 is identical to the assembly described in the previous figures, except for the addition of a flashing panel 40 that is integral with the mounting block bottom surface 9 and extends away from the mounting block 5. When the solar panel mounting assembly 1 with the flashing panel 40 is used to mount solar panels 50, the gasket 30 is not needed, because one edge of the flashing panel 40 can be disposed under, for example, roof shingles in order to divert water away from the underside of the solar panel mount assembly 1.

Although a preferred embodiment and other embodiments have been described, it will be recognized by those skilled in the art that other embodiments and features may be provided without departing from the underlying principals of those embodiments. The scope of the invention is defined by appended claims.

The invention claimed is:
1. A solar panel mounting assembly for securing a solar panel to a structure, comprising:
   a mounting block comprising:
      four mounting block partitions that are integral with a top end of the mounting block, with each mounting block partition perpendicular to adjacent mounting block partitions of the four mounting block partitions and with an end of each mounting block partition integral with a mounting block center section that extends from a mounting block top surface to a mounting block bottom surface;
      a threaded male member disposed within an elongate opening through the mounting block center section, with a portion of said threaded male member extending away from the mounting block top surface; and
      four mounting surfaces, with each mounting surface extending between and perpendicular to adjacent mounting block partitions, and with each of the mounting surfaces having a fastener opening that extends from the mounting surface to the bottom surface of the mounting block, with the fastener openings for use with fasteners in securing the mounting block to the structure;
   a mounting plate having a plate opening that extends from a plate top surface to a plate bottom surface, with the plate opening for positioning the mounting plate around the threaded male member, with the mounting plate also having grounding serrations integral with the plate bottom surface; and
   a fastener cap having a threaded female member for accepting said threaded male member, with the fastener cap also having a plurality of locking projections for securing the fastener cap to the mounting plate;
   whereby the solar panel mounting assembly can be used to secure the solar panel to the structure by fastening four mounting blocks to the structure, placing the solar panel between the mounting blocks with each corner of the solar panel resting on a mounting surface of a corresponding mounting block and abutting adjacent mounting block partitions, positioning four mounting plates around corresponding threaded male members, and threading four fastener caps onto the corresponding threaded male members in order to contact the mounting plate's grounding serrations with a conductive surface disposed around the perimeter of the solar panel, thereby securing the solar panel to the structure.

2. The solar panel mounting assembly of claim 1 in which the mounting block also comprises a plurality of notches integral with an outside surface of the mounting block, with the notches for use in holding electrical wires conducting electrical current from the solar panel off of the structure.

\* \* \* \* \*